Figure 1:
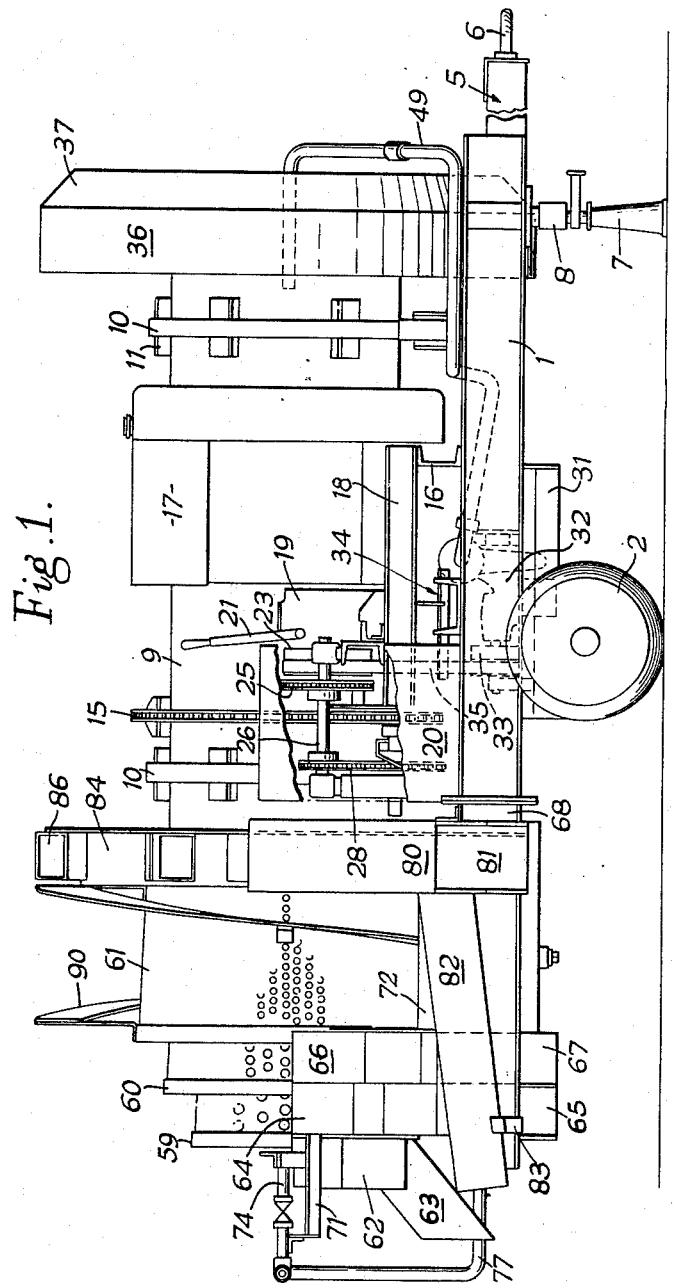

Sept. 26, 1961 F. W. PARKER 3,001,338
PLANT FOR WASHING STONE
Filed Oct. 17, 1955 5 Sheets-Sheet 2

Sept. 26, 1961 F. W. PARKER 3,001,338
PLANT FOR WASHING STONE
Filed Oct. 17, 1955 5 Sheets-Sheet 4

Fig. 6.

United States Patent Office 3,001,338
Patented Sept. 26, 1961

3,001,338
PLANT FOR WASHING STONE
Frederick William Parker, Leicester, England, assignor to Frederick Parker Limited, Leicester, England, a British company
Filed Oct. 17, 1955, Ser. No. 540,919
Claims priority, application Great Britain Oct. 28, 1954
3 Claims. (Cl. 51—164)

The present invention is concerned with a plant for washing bulk material such as sand and/or stone (in which term is included all kinds of stones and minerals of like hard and broken or divided characteristics, for example gravel and flint) with water.

An object of the invention is an improved plant for the uses stated, for example for recovering stone and sand separately from the mixture of the two which is found, and is quarried or raised, in many places. It is, moreover, capable of use either as a separate unit for the purposes indicated or as part of a machine having other component assemblies, e.g. a machine which also includes means for crushing the stone in a sand/stone mixture before passing the latter to the washing plant.

A further object is a plant for washing bulk material with an improved feed means.

Another object is a plant for washing bulk material with a compact and convenient discharging means. The latter may include scoops or buckets secured to the drum, as will be hereinafter described.

The feed means include a feed ring which is secured to, and is therefore rotatable with, the drum and is open at one side at least for receiving the stone and sand mixture to be washed and separated, this ring having ducts and an inner delivery ring to introduce the mixture so received into the drum.

The side of the feed ring which is left open is dependent on the intended use of the plant. Where, for example, the plant is a separate unit and is simply to be fed with fresh material from some external source, then the front side, i.e. that facing away from the drum, will best be open. On the other hand, it may be of advantage, where the plant forms part of some larger machine or assembly, to have the other side of the ring open for receiving the conglomerate to be treated, e.g. material fed in by a conveyor from a crusher. Again, the feed ring could be open at both sides, thus making the supply from either side alternative.

In a preferred arrangement the feed ring is of channelled formation at its periphery and is provided with angularly-spaced radial ducts to lead successive quantities of infed raw material to a tapered and partitioned delivery ring forming a central component of the feed ring and serving to deliver material received from the guide ducts centrally into the drum at the feed end of the latter. This arrangement is found to give a very satisfactory feed and to prevent entrained water from running back continually into the ring and interfering with the feed of fresh material.

Figure 2:
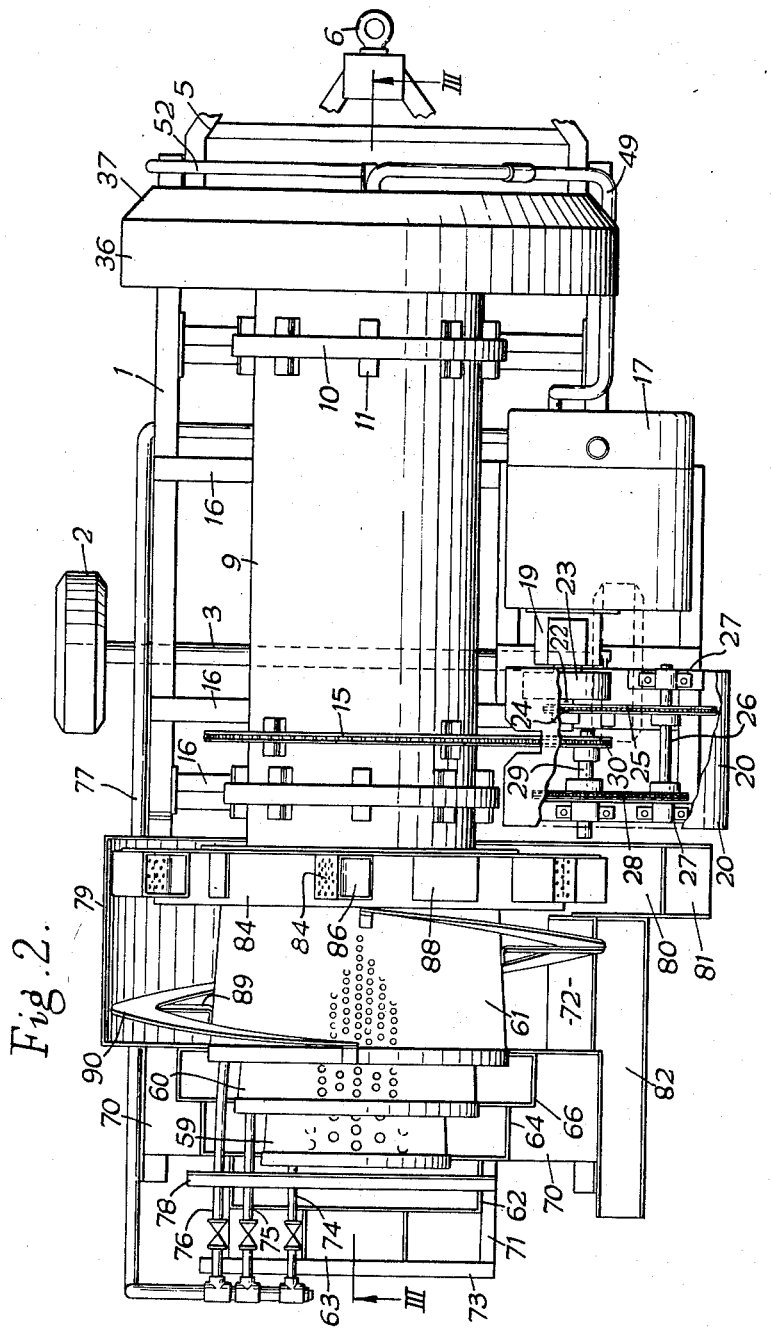
Figure 3:
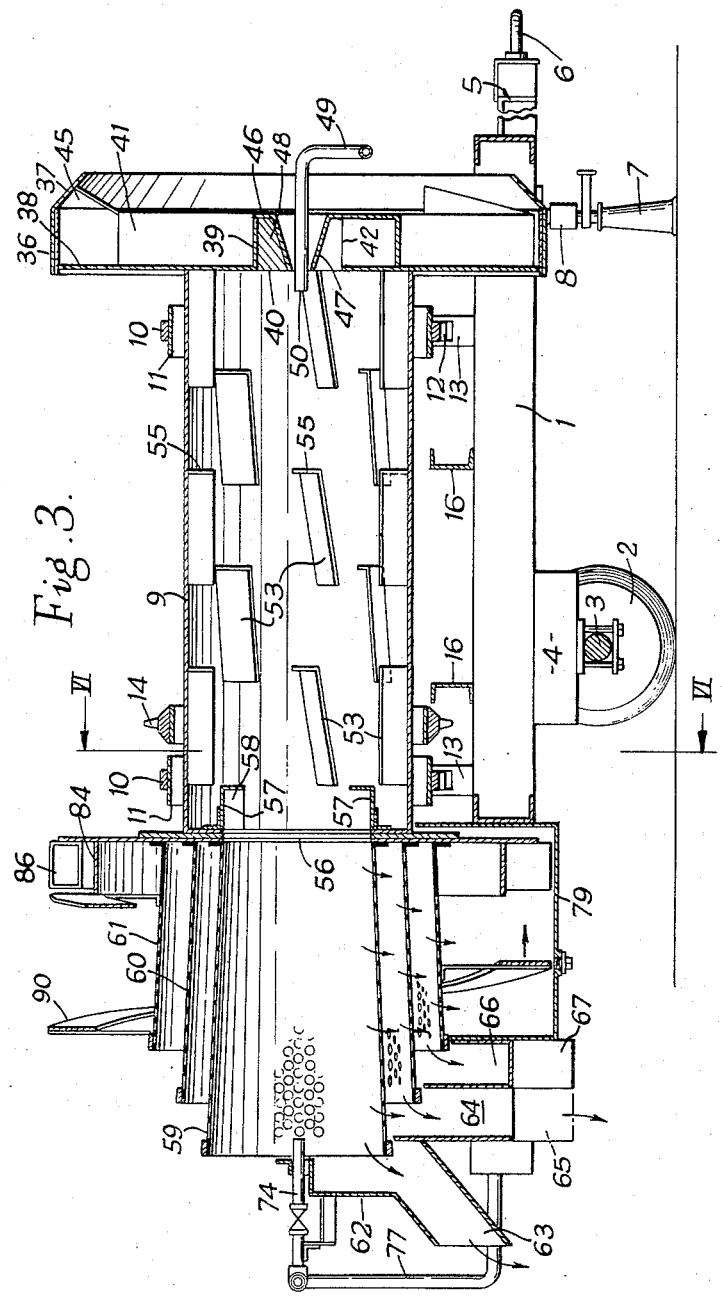
Figure 4:
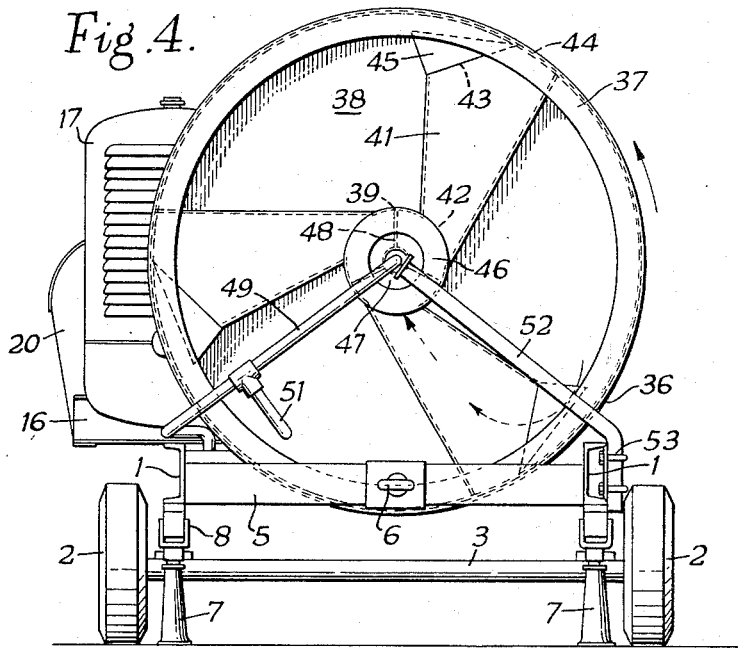
Figure 5:
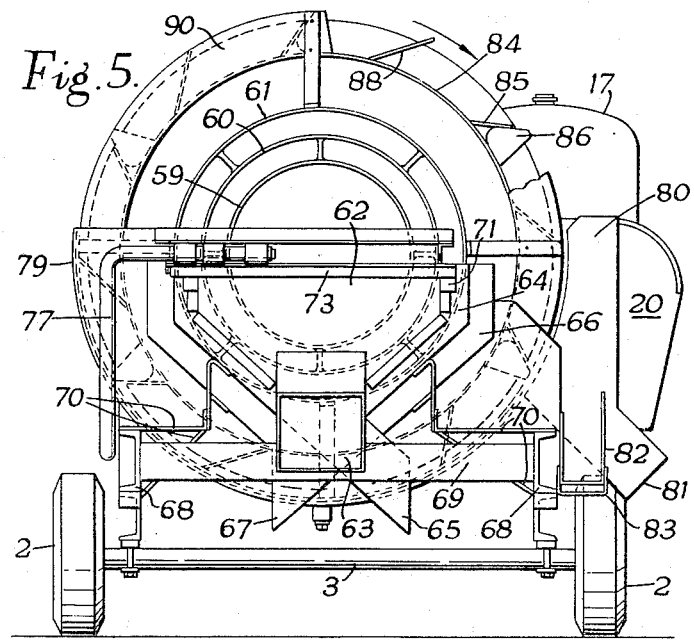

One specific form of a washing and sand/stone separating plant constructed in accordance with the invention is illustrated in the accompanying drawings, in which:

FIGURE 1 is a side view of the plant.
FIGURE 2 is a plan view of the same.
FIGURE 3 is a longitudinal cross section through the plant on the line III—III of FIGURE 2,
FIGURE 4 is an end view of the plant, as seen from the feed end,
FIGURE 5 is an elevational view from the opposite end,
FIGURE 6 represents a section on the line VI—VI of FIGURE 3, viewed in the direction of the arrows.

As indicated above, the plant illustrated is intended for the washing of a mixture of sand and stone, the subsequent separation of the sand from the stone, and the delivery of these two main components separately. In addition it is constructed so that it also performs a grading of the washed and separated stone.

Moreover, this particular plant is in the form of a compact and mobile machine which can be transported to the required site. Thus it has a main chassis formed by a pair of cross-braced longitudinal sills 1, this chassis being carried by a pair of wheels 2 which are mounted on an axle 3 suspended from the underside of the chassis by brackets 4, approximately midway along the length of the machine. The chassis 1 is provided at its front end with a draw bar frame 5 and a coupling eye 6 which enables the complete machine to be attached behind a towing vehicle. The chassis further carries, towards its front end, legs 7 which are hinged at 8 and can be swung back or, as illustrated, lowered into position when the plant is stationary so as to form struts which maintain the uncoupled plant with its chassis horizontal. These legs 7 are advantageously in the form of jacks to enable their effective height to be varied in accordance with ground conditions.

Mounted on the chassis 1 and extending over the major part of the length of this chassis is an imperforate cylindrical drum 9 which, in the illustrated horizontal condition of the chassis, likewise has its axis horizontal. The drum 9 is equipped externally with a pair of bearing rings 10 secured thereto, in each case, by a ring of spaced channel-section brackets 11. Each of the rings runs on a pair of rotary rollers 12 carried by brackets 13 on a cross brace 16 of the chassis. Further, the drum has, between these rings 10, a toothed ring 14, likewise secured to the drum by spacing brackets, this ring 14 being driven by a chain 15 from a power unit disposed at one side of the machine and supported on further cross braces 16 of the chassis.

The power unit comprises an internal combustion engine disposed in a casing 17 which is supported on the braces 16 through longitudinal rails 18, these also serving to support a clutch housing 19 and the front end of a gear case 20 which is supported at the rear directly by the side arms of the chassis 1.

When a lever 21 controlling the clutch is brought into the engaged position, the drive from the engine shaft is transmitted to a stub shaft 22 carrying a pulley 23 and a chain wheel 24. The drive from wheel 24 is transmitted through a chain 25 to a lay shaft 26, mounted in brackets 27 in the gear casing 20, and from the latter through further chain gearing 28 to a shaft 29, similarly mounted in casing 20 and carrying a pinion 30 meshing with the chain 15. By an appropriate reduction in the transmission ratio, through the chain and chain wheel gearing described, the drum 9 is rotated at an appropriate speed.

Slung between the side arms of the chassis 1 below the drum is a bracket 31 on which is mounted a pump 32, the operating shaft of which carries fast and loose pulleys 33. A belt-striking fork 34 is mounted on the chassis and is movable to shift a belt 35, running on the pulley 23, from one to the other of the pulleys 33 for the purpose of coupling the engine drive to the pump 32 as and when required.

At its forward end the drum 9 has secured thereto a feed ring 36 of larger diameter than the drum and of generally cylindrical shape but with a frusto-conical rim 37 at the front side. At the rear side the feed ring is substantially closed by a wall 38, and has a central interrupted inner delivery ring 39 defining a central opening 40 in the wall 38.

Disposed around and within the feed ring are three equally-spaced substantially radial ducts 41, each of rectangular transverse section and open at their inner and outer ends 42 and 43 respectively (see FIGURE 4). Each of the ducts 41 is connected at an outer closed edge 44 to the cylindrical periphery of ring 36, and at the mouth 43 thereof has a triangular wing plate 45 connecting it to the rim 37. The inner feed ring 39 is apertured at points around its periphery and there communicates with each of the ducts 41 through the lower opening 42 of the latter. The outer wall 46 of the inner delivery ring 39 carries a coaxial cone 47 which projects into the opening 40. In addition, a radial partition 48 is disposed, midway between each adjacent pair of openings 42, between the cone 47 and the periphery of ring 39.

As has already been indicated, the ring 36 may be modified and be open at the rear side thereof for an infeed of material from this side, or could be open at both sides, in which event the rim 37 would be provided at the rear side and the wall 38 at the front side. Again, the wall 38 could be omitted and the ring 36 open at both sides, in which case a rim such as 37 would be provided at both sides and secured to the inner ring 39 and the drum by means of the ducts 41.

The parent mixture to be dealt with is supplied manually or mechanically into the bottom of the feed ring, in the case illustrated from the open front side, and as this feed ring rotates with the drum 9 the infeed material passes through the mouth 43 of the next-following duct 41. As the feed ring continues to turn the material passes towards the axis of the ring and through the corresponding opening 42 into the compartment in the ring 46 communicating therewith, eventually sliding over the cone 47 and through the opening 40 into the interior of the drum 9. The partitions 48 in this inner delivery ring 39 prevent the mixture running back, this being a point of particular importance when the interior of the main feed ring 36 is wet, as will be referred to below.

Water is delivered through a pipe 49 supplied by the pump 32, this pipe 49 passing through the central delivery ring 46 the opening 40 and terminating at 50 just inside the drum 9, such that the stone/sand mixture is admixed and thoroughly commingled with the water immediately on entering this drum. The pipe 49 is supported at its delivery end by an inclined tubular strut 52 which is shackled at 53 to the longitudinal sill 1 at one side of the machine.

A branch line 51 from the pipe 49 is arranged to deliver a certain amount of water into the conical rim of the feed ring 36, so as to keep the working faces of this ring flushed and clean, the partitions 48 in the inner delivery ring preventing the wet mixture from running back into the main body of the feed ring.

The drum 9 is provided internally along its length with obliquely disposed blades or baffles 53 arranged in staggered fashion, these blades being secured by angle pieces 54 (see FIGURE 6) to the wall of the drum and closed at their inner ends 55, so as to have the effect of agitating and advancing the stone/sand water mixture along the drum towards its discharge end. At the same time these blades 53 produce, in known fashion, a thorough washing action by a cascading effect in which successive quantities of the mix picked up by the blades are poured inwards of the drum as the latter rotates.

At its discharge end the drum 9 has a delivery opening 56 of smaller diameter than the drum itself and has, projecting internally therefrom, adjacent this aperture and tangential thereto, opposed boxes 57 for lifting the stone/sand water slurry at this discharge end through the opening 56. Each of the lifting boxes 57 is constituted by a length of angled metal with a web 58 across its inner end.

Secured to the drum 9 and coaxial with the latter at its discharge end are three concentric perforated screens 59, 60 and 61 of different diameters. The screens 59, 60 and 61 are conically tapered outwards and are formed with a multiplicity of perforations of a size decreasing from those of the inner screen 59 to those of the outer screen 61. The screens are also of different lengths such that screen 59 terminates at its outer open end a greater distance from the drum 9 than the screen 60 and the latter in turn being of greater axial length than the screen 61.

The mouths of the screens each communicates with a separate chute which is directed so as to deliver the stones received from the respective screen to a separate point at the rear end of the machine. Hence, the mouth of the inner and longer screen 59 discharges into an open-topped, tapered, hopper-like casing 62 arranged at the rear of the machine and having a centrally and rearwardly directed delivery chute 63, the intermediate screen 60 delivers its stones into a hopper casing 64 arranged in front of casing 62 and having at its lower end an inclined delivery chute 65 which directs the stones from the mouth of screen 60 to one side of the centre line of the machine (see FIGURE 5), whilst a similar and larger hopper casing 66 is arranged in front of casing 64 to take the stones delivered from the mouth of outer screen 61, this further hopper having a discharge chute 67 directed towards the opposite side of the centre line from the chute 65.

This screen and chute structure is supported by a framework including a pair of side beams 68 secured to the main chassis and extending rearwards therefrom, these side beams being connected, inter alia, by a cross piece 69 (see FIGURE 5). The members 68 of this supporting frame carry brackets 70 supporting the hoppers 64 and 66 from the side, whilst the hopper 62 is secured to the rear side of hopper 64, which also serves to support braces 71 extending at the rear end of the machine.

In turn, the braces 71 carry a cross piece 73 which forms a support, from the underside, of valve-controlled spray pipes for flushing the interior of the screens. These pipes, denoted 74, 75 and 76, are branched from a pipe 77 running along one side of the machine and communicating with the pump 32. A cross bar 78 serves to locate the pipes 74 to 76 at their upper sides.

Secured between the hopper 66 and the rear end wall of the drum 9, is a larger size trough 79 having, at the drum end, and to one side of the machine, a casing 80 with a sand discharge chute 81. In addition the trough has at one side a curved weir plate 72 which is adjustable heightwise and communicates with an inclined water discharge channel 82 which is mounted in inclined fashion by means of a clip 83 secured to the beam 68 at this side.

Also secured at the discharge end of the drum 9 is a sand draining ring 84 running within the part circular inner end of the trough 79, this ring 84 having secured around its periphery, by oblique mounting plates 85, a plurality of buckets 86 each of tapered pocket form with an open mouth facing in the direction of travel of the draining ring and perforated at the trailing side 87. Alternating with the buckets 86 around the ring are inclined deflector plates 88.

Secured by brackets 89 around the screen 61 is a spiral blade 90 which is arranged to run over the bottom of the trough 79 for the purpose of pushing or scraping any sand deposited in the rear part of this trough towards the forward end of the latter below the ring 84.

Hence, as described above, a parent mixture of sand and stone, when fed into the channel in the periphery of ring 36, is picked up by the appropriate guide duct 41 of the rotating ring and is fed centrally into the feed end of drum 9 and poured through water delivered from the end 50 to pipe 49, so that all parts of the mix are automatically and thoroughly commingled with water. The slurry passes along the drum 9 under the effect of rotation of the same and the action of the blades 53, whilst being subjected to a cascading action which further loosens the sand and other adherent material from the stone. When eventually the mixture is transferred by the boxes 57 through the opening 56 into the inner screen, the majority of the water and sand, now separated from the stone, immediately pass successively through the perforations in the front ends of the screens 59, 60 and 61, so that a large proportion of the sand is deposited at the forward end of the trough 79 and the path of the bucket rotating with the draining ring 84.

Consequently, each bucket 86 in turn scoops up a quantity of the sand from the lower part of the trough and, as the bucket moves upwards, the water is drained from the bucket through its perforations 87 and runs back into the trough. When this particular bucket is turned over into the position illustrated by the bucket shown in full line in FIGURE 5, the sand is discharged and deflected by the preceding plate 88 into the casing 80, thence being discharged through the chute 81 to a collecting receptacle.

Meanwhile a grading of the other components of the mix is effected by the screens 59, 60 and 61. The larger stones and any large dross slowly run down the screen 59 to be discharged through the chute 63, again into a suitable collector, whilst the smaller stones pass through the perforations of inner screens 59 on to screen 60 where they are either passed again through to screen 61, or, if of selected size, are eventually discharged through the chute 65 to another collector.

The stones and any sand not already separated are passed outwards to the screen 61, the residual sand gravitating into the rear part of the trough 79 whilst the stones are discharged through chute 67. As a result a certain amount of sand becomes deposited in the trough 79 out of the path of the buckets, and this sand is scraped forward to the required position for collection by these buckets under the action of the helical blade 90. This arrangement ensures a thorough cleaning of the stone before it is eventually discharged and, at the same time, collection of all the sand freed from the parent mixture.

It will also be observed that all this feed through the machine and separation is derived from the rotation of the main drum 9, powered by the engine 17, whilst the latter also initiates the delivery of the flushing water at the feed and delivery ends of the machine.

Consequently, the unit is self-contained and, as already described, is mobile, so that it can be quickly transported to the required site.

What I claim then is:

1. In apparatus for washing bulk material and having a rotary drum within which the material is commingled with water, means for feeding the material into one end of the drum comprising a rotatably mounted feed ring having inwardly extending flanges, an inner delivery ring mounted to rotate co-axially with the feed ring and having ports therein, ducts extending radially between the ports and the feed ring for carrying the bulk material from the feed ring to the delivery ring, a conical member so mounted centrally within the delivery ring as to guide bulk material emanating from the ports into the drum, and partitions extending radially between the conical member and the delivery ring intermediate the ports to separate the flow of one port from another.

2. Apparatus according to claim 1 wherein the flanges are of such limited inward extent as to leave at least one side of the feed ring substantially open.

3. Apparatus according to claim 1 further comprising means for feeding water into the feed ring.

References Cited in the file of this patent

UNITED STATES PATENTS

| | | |
|---|---|---|
| 272,726 | Lucas | Feb. 20, 1883 |
| 800,480 | Palmer | Sept. 26, 1905 |
| 1,272,801 | Hardinge | July 16, 1918 |
| 2,179,154 | Lyons | Nov. 7, 1939 |
| 2,198,463 | Scott | Apr. 23, 1940 |
| 2,331,135 | Overstrud | Oct. 5, 1943 |
| 2,568,063 | Gilbert et al. | Sept. 18, 1951 |
| 2,607,488 | Davies | Aug. 19, 1952 |
| 2,711,557 | Russell | June 28, 1955 |

FOREIGN PATENTS

| | | |
|---|---|---|
| 101,064 | Germany | Jan. 23, 1899 |

OTHER REFERENCES

Taggart: "Handbook of Mineral Dressing," John Wiley and Sons, New York, Section 10, page 08.